(12) United States Patent
Chen

(10) Patent No.: US 8,830,826 B2
(45) Date of Patent: Sep. 9, 2014

(54) SYSTEM AND METHOD FOR COMPUTING A BACKUP EGRESS OF A POINT-TO-MULTI-POINT LABEL SWITCHED PATH

(75) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 353 days.

(21) Appl. No.: 13/273,678

(22) Filed: Oct. 14, 2011

(65) Prior Publication Data

US 2012/0092986 A1 Apr. 19, 2012

Related U.S. Application Data

(60) Provisional application No. 61/393,576, filed on Oct. 15, 2010.

(51) Int. Cl.
*H04L 12/26* (2006.01)

(52) U.S. Cl.
USPC .......................................................... 370/228

(58) Field of Classification Search
CPC ...................................................... H04L 12/26
See application file for complete search history.

(56) References Cited

U.S. PATENT DOCUMENTS

| | | |
|---|---|---|
| 2008/0089227 A1 | 4/2008 | Guichard et al. |
| 2010/0008222 A1* | 1/2010 | Le Roux et al. ............. 370/228 |
| 2010/0177631 A1 | 7/2010 | Chen et al. |
| 2011/0199891 A1 | 8/2011 | Chen |
| 2013/0235716 A1* | 9/2013 | Vasseur ........................ 370/221 |

FOREIGN PATENT DOCUMENTS

WO 2010080972 A1 7/2010

OTHER PUBLICATIONS

Chen, H., "Extensions to the Path Computation Element Communication Protocol (PCEP) for Backup Egress of a Traffic Engineering Label Switched Path," draft-chen-pce-compute-backup-egress-02,txt, Jul. 9, 2011, 16 pages.
Le Roux, JL., Ed., et al. "OSPF Protocol Extensions for Path Computation Element (PCE) Discovery," RFC 5088, Jan. 2008, 21 pages.
Foreign Communication From a Related Counterpart Application, PCT Application No. PCT/CN2011/080826, International Search Report dated Jan. 19, 2012, 3 pages.
Foreign Communication From a Related Counterpart Application, PCT Application No. PCT/CN2011/080826, Written Opinion dated Jan. 19, 2012, 11 pages.
Bradner, "Key Words for Use in RFCs to Indicate Requirement Levels," RFC 2119, Mar. 1997.
Awduche, et al., "RSVP-TE: Extensions to RSVP for LSP Tunnels," RFC 3209, Dec. 2001.

(Continued)

*Primary Examiner* — Sulaiman Nooristany
(74) *Attorney, Agent, or Firm* — Futurewei Technologies, Inc.

(57) ABSTRACT

An apparatus for requesting computation of a backup egress path comprising a processor configured to send a path computation element (PCE) protocol (PCEP) request (PCReq) message requesting computation of the backup egress path to protect against a fault in a primary egress path of a Point to Multi-Point (P2MP) or Point-to-Point (P2P) label switched path (LSP), wherein the backup egress path extends from a previous-hop internal node of the primary egress node of the P2MP or P2P LSP to a backup egress node. A method for advertising or discovering a backup egress path computation capability comprising exchanging a message that indicates that a PCE comprises a backup egress path computation capability.

20 Claims, 12 Drawing Sheets

(56) References Cited

OTHER PUBLICATIONS

Pan., Ed., et al., "Fast Reroute Extensions to RSVP-TE for LSP Tunnels," RFC 4090, May 2005.
Vasseur, Ed., et al., "Path Computation Element (PCE) Communication Protocol (PCEP)," RFC 5440, Mar. 2009.
Aggarwal, Ed., et al, "Extensions to Resource Reservation Protocol—Traffic Engineering (RSVP-TE) for Point-to-Multipoint TE Label Switched Paths (LSPs)," RFC 4875, May 2007.
Zhao, Ed., et al., "Extensions to the Path Computation Element Communication Protocol (PCEP) for Point-to-Multipoint Traffic Engineering Label Switched Paths," RFC 6006, Sep. 2010.
Yasukawa, et al., "Path Computation Clients (PCC)—Path Computation Element (PCE) Requirements for Point-to-Multipoint MPLS-TE," RFC 5862, Jun. 2010.
Farrel, et al., "A Path Computation Element (PCE)—Based Architecture," RFC 4655, Aug. 2006.
Zhao, Ed., et al., "Extensions to the Path Computation Element Communication Protocol (PCEP) for Point-to-Multipoint Traffic Engineering Label Switched Paths," draft-ietf-pce-pcep-2pmp-extensions-06.txt, Dec. 20, 2009, 32 pages.
Zhao, Ed., et al., "Extensions to the Path Computation Element Communication Protocol (PCEP) for Point-to-Multipoint Traffic Engineering Label Switched Paths," draft-ietf-pce-pcep-2pmp-extensions-09.txt, Mar. 31, 2010, 31 pages.
Farrel, A., et al., "A Path Computation Element (PCE)-Based Architecture," RFC 4655, Aug. 2006, 40 pages.
Tomonori, T., et al., "Diverse Path Setup Schemes in Multi-Domain Optical Networks," 5th International Conference on Broadband Communications, Networks and Systems, XP031414794, Sep. 8, 2008, pp. 523-530.
Foreign Communication From a Counterpart Application, European Application No. 11832162.9, Extended European Search Report dated Feb. 4, 2014, 8 pages.

\* cited by examiner

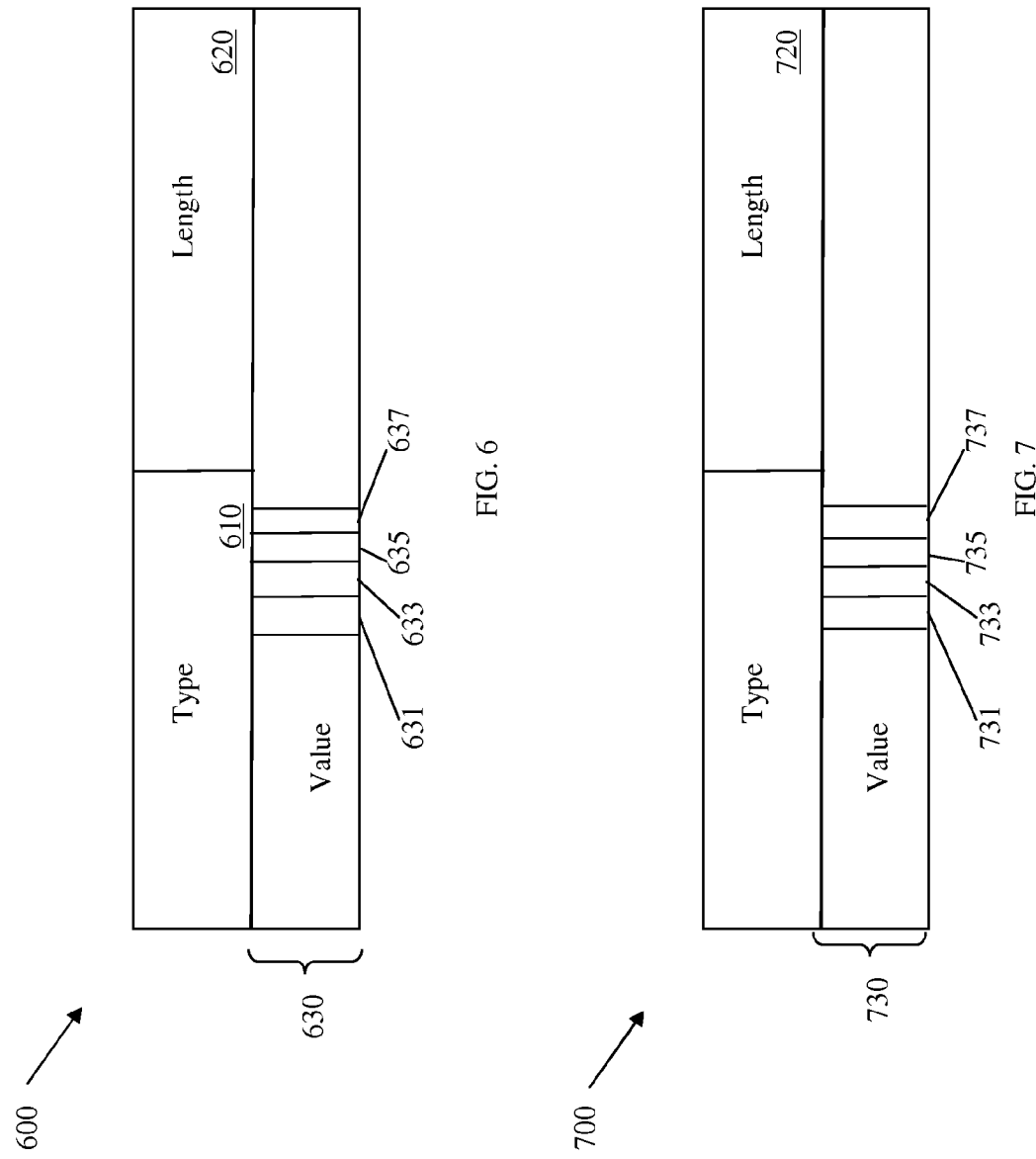

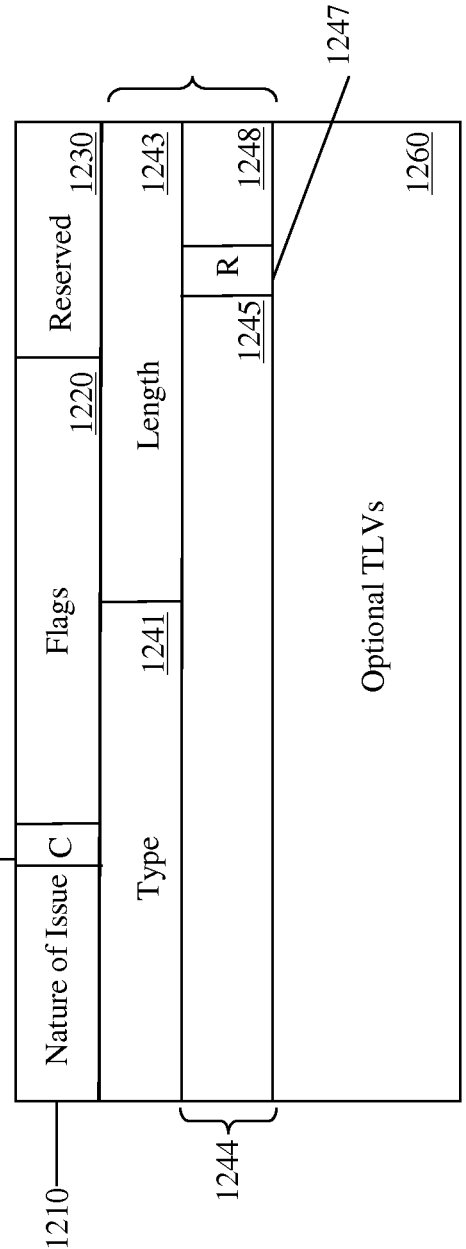

SYSTEM AND METHOD FOR COMPUTING A BACKUP EGRESS OF A POINT-TO-MULTI-POINT LABEL SWITCHED PATH

CROSS-REFERENCE TO RELATED APPLICATIONS

The present application claims priority to U.S. Provisional Patent Application No. 61/393,576 filed Oct. 15, 2010 by Huaimo Chen, and entitled "System and Method for Computing a Backup Egress of a Point-to-Multi-Point Label Switched Path", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In modern network communications, a source may wish to multicast the same content to multiple destinations simultaneously. A basic way of accomplishing this is to concurrently transport the content over a plurality of individual point-to-point (P2P) label-switched-paths (LSPs) between the source and respective destinations. In some instances, one or more of the P2P LSPs may extend from an ingress edge router of an intermediate domain to an egress edge router of the same or different intermediate domain, where the ingress edge router connects to the source and the egress edge router connects to a respective destination. Because managing multiple P2P LSPs may be cumbersome and inefficient, one or more of the P2P LSPs (or portions thereof) may be aggregated into a point-to-multi-point (P2MP) LSP, which may resemble a tree whose trunk is rooted at a source (or an ingress edge router connecting to the source) and whose branches extend to egress edge routers (e.g., the leaves) connecting to the respective destinations.

Computation of a P2MP LSP that extends through only one autonomous system (AS), e.g., local routing domain controlled by unique routing policy, may be performed centrally by a single Path Computation Entity (PCE) that has access to the AS domain topology information. However, central computation of a P2MP LSP extending through multiple AS domains (e.g., an inter-domain P2MP LSP) may be difficult or impossible because there may not exist a central database containing the topology information of each relevant AS domain. For instance, servers in the provider domain may not contain information relating to the source and/or destinations (e.g., topology information of the source/destination domains). Specifically, many AS domains do not disseminate their local topological information to external entities (e.g., non-native PCEs or nodes in other AS domains) for privacy and/or security reasons. Even when the involved AS domains are willing to disseminate their topological information, central computation may be impractical because storing and/or updating the topological information for a large number of AS domains may be quite burdensome. As such, computation of P2MP or P2P LSPs requiring information (e.g., topology information) that relates to other domain (e.g., LSPs crossing into other domains or terminating at egress routers that forward the content to external domains/destinations) may be performed in a distributed manner using a plurality of PCEs that are locally positioned in or near the various AS domains (e.g., a source PCE, a provider PCE, a destination PCE, etc.). PCE-based architectures are discussed in detail in Internet Engineering Task Force (IETF) publication Request for Comments (RFC) 4655, and set up of a P2MP LSP is discussed in IETF publication RFC 4875, both of which are incorporated herein by reference as if reproduced in their entireties.

SUMMARY

Disclosed herein is an apparatus for requesting computation of a backup egress path comprising a processor configured to send a PCE protocol (PCEP) request (PCReq) message requesting computation of the backup egress path to protect against a fault in a primary egress path of a P2MP or P2P LSP, wherein the backup egress path extends from a previous-hop internal node of the primary egress node of the P2MP or P2P LSP to a backup egress node.

Also disclosed herein is a method for computing a backup egress path comprising: receiving a PCReq message from a Path Computation Client (PCC) requesting computation of the backup egress path to provide fault protection for a primary egress path of a P2MP or P2P LSP, wherein the primary egress path extends from a previous-hop internal node of the primary egress node of the P2MP or P2P LSP to the primary egress node.

Also disclosed herein is a method for advertising or discovering a backup egress path computation capability comprising: exchanging a message that indicates that a PCE comprises a backup egress path computation capability.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 illustrates an embodiment of a PCE capability sub-type-length-value (TLV).

FIG. 7 illustrates an embodiment of a PCE capability TLV.

FIG. 11 illustrates an embodiment of a PCEP error object.

FIG. 12 illustrates an embodiment of a NO-PATH object.

DETAILED DESCRIPTION

Figure 1:
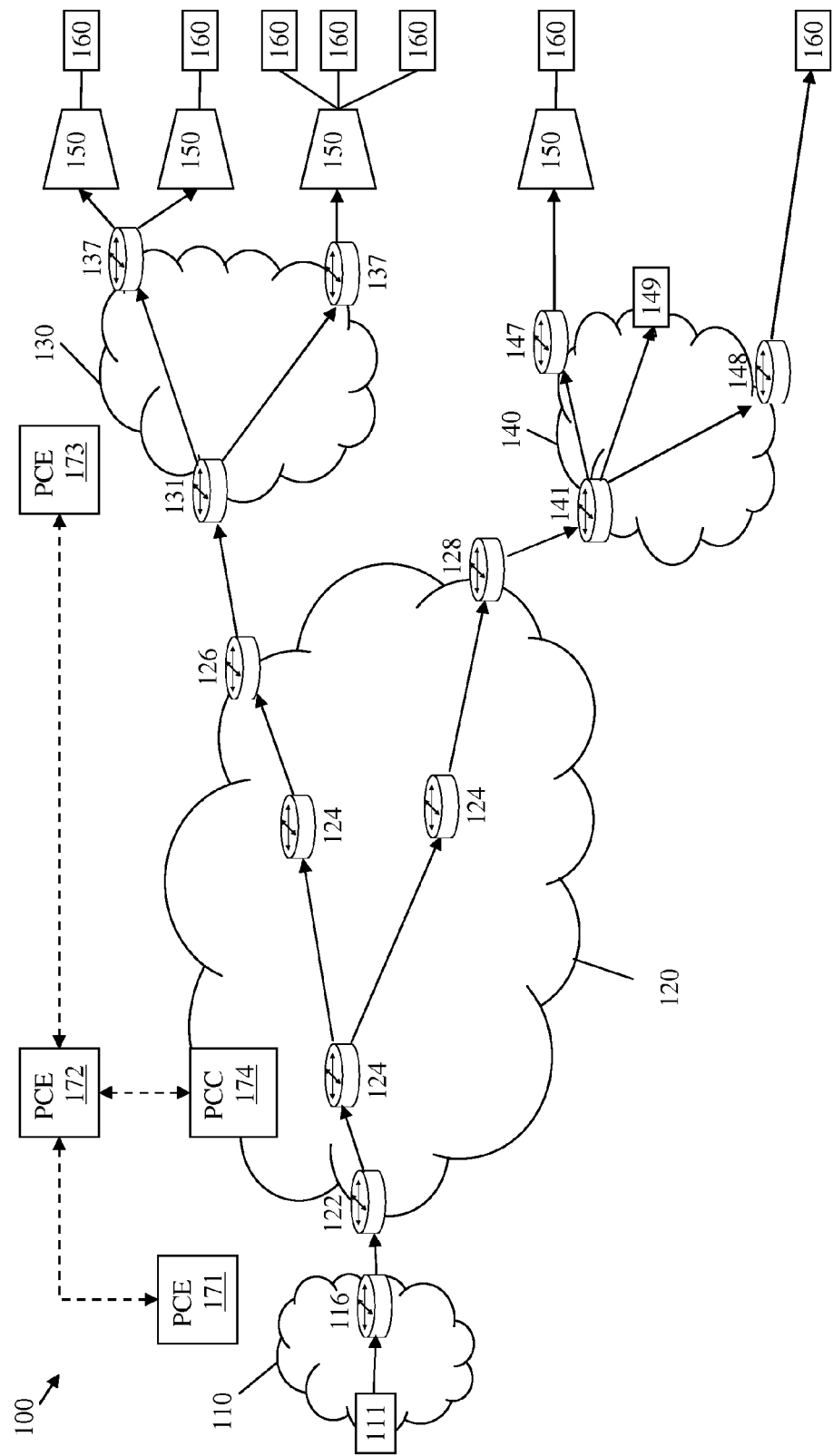
FIG. 1 illustrates an embodiment of a network comprising a P2MP LSP.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and architecture for providing localized backup protection to a primary egress of a P2MP (or P2P) LSP by establishing one or more backup egress LSPs. Specifically, a backup egress LSP may be established between a previous-hop node of a primary egress node of the P2MP or P2P LSP and a backup egress node to protect against failures in the primary egress node (or links attached thereto). Upon detecting a fault in the primary egress node (or link thereto), the previous-hop node may switch the traffic to the backup egress LSP, thereby providing faster fault recovery (while consuming fewer network resources) than the backup/primary P2MP LSP configuration. Also disclosed herein are proprietary extensions to PCEP (and PCE discovery (PCED) protocol) that facilitate the advertisement of a backup egress path computation capability by a PCE, as well as the computation of the backup egress path. Additionally, localized protection may be provided to the ingress edge router and/or next-hop link(s) by establishing a backup P2MP sub-tree.

As used herein, the term "primary ingress LSP" may refer to an established path/sub-tree extending from a primary ingress edge node of a P2MP or P2P LSP to one or more subsequent-hop/next-hop internal nodes of the primary ingress edge node. In some embodiments, the term "primary ingress path" may correspond to a route for the primary ingress LSP (e.g., prior to and/or subsequent to establishment of the primary ingress LSP). Likewise, the term "backup ingress LSP" may refer to an established path/sub-tree extending from a backup ingress edge node to one or more subsequent-hop/next-hop internal nodes of a primary ingress edge node of a P2MP or P2P LSP. In some embodiments, the term "backup ingress path" may correspond to a route for the backup ingress LSP (e.g., prior and/or subsequent to establishment of the primary ingress LSP/sub-LSP). Further, terminology relating to a request for computation of a backup ingress path may refer to a request for the identification/selection of a backup ingress edge node, a request for the computation of a backup ingress path, or both. Likewise, the phrase "backup ingress path computation capability" may refer to a PCE's ability to identify/select a backup ingress edge node, compute a backup ingress path, or both.

As used herein, the term "primary egress LSP" may refer to an established path extending from a previous-hop internal node of a primary egress edge node of a P2MP or P2P LSP to the primary egress edge node. In some embodiment, the term "primary egress path" may correspond to a route for the primary egress LSP (e.g., prior to and/or subsequent to establishment of the primary egress LSP). Likewise, the term "backup egress LSP" may refer to an established path extending from a previous-hop internal node of a primary egress edge node of a P2MP or P2P LSP to a backup egress node. In some embodiment, the term "backup egress path" may correspond to a route for the backup egress LSP (e.g., prior and/or subsequent to establishment of the primary egress LSP/sub-LSP). Further, the terminology relating to a request for the computation of a backup egress path may refer to a request for the identification/selection of a backup egress edge node, a request for the computation of a backup egress path, or both. Likewise, the phrase "backup egress path computation capability" may refer to a PCE's ability to identify/select a backup egress edge node, compute a backup egress path, or both.

FIG. 1 illustrates an embodiment of a network 100 comprising a P2MP LSP (illustrated by the solid arrows). The network 100 comprises a source domain 110, a provider domain 120, a plurality of destination domains 130, 140, a plurality of access point (AP) modems 150, a plurality of customer premises equipment (CPEs) 160, a plurality of PCEs 171-173, and a Path Computation Client (PCC) 174, arranged as shown in FIG. 1. The P2MP LSP may begin at an ingress edge router of the provider domain 120 that has a connection to the source domain 110 (e.g., ingress edge router 122) and branch through the provider domain 120 to one or more egress edge routers in the provider domain 120 having connections (or the ability to forward content) to nodes (e.g., edge routers 126, 128) in the respective destination domains 130, 140. In some embodiments, the P2MP LSP may end at the egress edge routers in the provider domain 120. In other embodiments, the P2MP LSP may end at any of the routers in the destination domains 130, 140 (e.g., routers 131, 141, 137, 147). For instance, the P2MP LSP may end at edge routers in the destination domains 130, 140 that have connections to the access point modems 150 and/or the CPEs 160 (e.g., edge routers 137, 147). In some embodiments, the destination domains 130, 140 may be intermediate domains that distribute the multicast content to the AP modems 150 and or CPEs 160. In some embodiments, the network 100 may comprise multiple intermediary domains (e.g., a plurality of provider domains) as well as any number of destination domains (e.g., 1, 2, . . . N, where N is an integer greater than zero). Further, the P2MP LSP (as well as other LSPs) may be established through the provider domain 120 according to strategic policies aimed at, inter alia, optimizing network resources while satisfying service requirements/agreements. Such policies may dictate various computational constraints (e.g., number of hops, bandwidth capacity, etc.) from which the paths are computed, in which case the paths may be referred to as Traffic Engineered (TE) paths. Hence, the P2P/P2MP LSPs that are described throughout this disclosure may comprise P2P/P2MP TE LSPs.

The source domain 110 may be any AS domain that contains devices that deliver data packets to the primary ingress node 122 of the P2MP LSP. The source domain 110 may comprise a source node 111 and an egress customer edge (CE) router 116 arranged as shown in FIG. 1, as well as other nodes (e.g., internal nodes, etc.; not shown in FIG. 1). The source node 111 may multicast traffic (e.g., data packets) to the CPEs 160 via the P2MP LSP by forwarding the traffic to the ingress edge router 122 in the provider domain 120 via the CE router 116.

The provider domain 120 may be any AS domain that comprises the P2MP LSP (or portions thereof). The provider domain 120 may comprise an ingress edge router 122, a plurality of internal routers 124, and a plurality of egress edge routers 126-128, as shown in FIG. 1. The ingress edge router 122 may receive the multicast content from the CE router 116, and thereafter distribute the content to the egress edge routers 126, 128 via the internal routers 124. In an embodiment, the edge routers 122, 126, and 128 may be provider edge (PE) routers. The egress edge routers 126-128 may forward the content to the external destination nodes (e.g., CE routers 131, 141, etc.) in the destination domains 130, 140.

The destination domains 130, 140 may be any domains that contain devices configured to receive multicast content (e.g., destination nodes) and/or devices configured to distribute multicast content directly or indirectly (e.g., via the AP modems 150) to devices configured to receive multicast content (e.g., the CPEs 160). In an embodiment, the destination domains 130, 140 may contain devices that are connected or coupled to the egress edge routers 126 and 128, the AP modems 150, the CPEs 160, or combinations thereof, e.g., as indicated by the routers 131 137, 141, 147, and 148. In some embodiments, the destination domains 130, 140 may contain devices or components that represent the last hop on the P2MP LSP prior to removal of the packets from the P2MP LSP, e.g., as indicated by the egress edge router 147 in destination domain 140. In other embodiments, the destination domains 130, 140 may contain devices that remove packets from the P2MP LSP, as indicated by the destination node 149 in destination domain 140. The destination domain 130 may comprise an ingress CE router 131 and a plurality of AP routers 137. Similarly, the second destination domain 140 may comprise an ingress CE router 141 and a plurality AP routers 147, 148, as well as a destination node 149.

The AP routers 137, 147 may be accessed by one or more CPEs 160 via the AP modems 150, which may be distributed in or around the customer premise. The AP modems 150 may be any network component that allows the CPEs 160 to link the AP routers 147, and may include any communication equipment located there between. The CPEs 160 may be any network component on the customer premises that allows a client to access the content, e.g., laptop, smart phone, television, etc. The AP router 148 may be accessed by one or more of the CPEs 160 directly, such that one or more intermediate distribution devices (e.g., one of the AP modems 150) may be omitted or bypassed entirely. In the same or other embodiments, one or more destination nodes 149 may be located in the destination domain 140, such that the multicast traffic is received in the destination domain 140. In some embodiments, one or more of the AP modems 150 and/or the CPEs 160 may be considered part of (or an extension to) the destination domains 130, 140.

Generally, the various network routers 116-147 may be network nodes that support the transportation of traffic (e.g., data packets) through the label switched network 100. As used herein, the term "router" is synonymous with network node, and may comprise a variety of different devices, e.g., switches, bridges, routers, or combinations thereof. The term "edge router" may mean any router that is located at a network or domain edge and has the capability of establishing inter-domain connections (e.g., LSPs extending from one AS domain to another AS domain) for communicating traffic (e.g., data packets) between AS domains. For instance, the edge routers 116, 122, 126, 128, 131, and 141 may comprise label edge routers (LERs), which may be configured to append/remove labels to/from data packets transported between the domains 110-140. The term "internal router" may be used synonymously with "core router/node," and may comprise any router within an AS domain or network that has the capability of carrying traffic between edge routers. For instance, the internal routers 124 (e.g., core nodes) may be capable of forwarding/receiving packets to/from other entities within the provider domain 120, e.g., the edge routers 122, 126, 128 and other internal routers 124. In some embodiments, the internal routers 124 may add/remove labels from the packets that are used within the provider domain 120, e.g., next-hop labels, etc. However, the internal routers 124 may lack the functionality to establish inter-domain connections, and hence may rely on the edge routers 122, 126, 128 for communication of packets between AS domains. For instance, the internal routers 124 may be required to forward traffic (e.g., data packets) to the edge routers 122, 126, 128 to achieve inter-domain packet transfer to the source/destination domains 110, 130, 140.

The PCEs 171-173 may be any entities that are capable of computing P2P or P2MP paths (e.g., including paths crossing between domains) based on topological information and computational constraints. In an embodiment, the PCEs 171-173 may be assigned to service the various domains 110-140. For instance, the PCE 171 may service the source domain 110, the PCE 172 may service the provider domain 120, and the PCE 173 may service the destination domain 130. The network 100 may comprise an additional PCE that services the destination domain 140. In an embodiment, one or more of the PCEs 171-173 may be located at a node or server in one of the domains 110-130, or alternatively, in a server that is located outside of the AS domains 110-130.

The PCC 174 may be any entity that is configured to communicate with PCE 172 (or any other PCE) for requesting path computation. Additionally, the PCC 174 may be configured to relay domain topology and/or TE information to the PCE 172. In some embodiments, the PCC 174 may be located in the ingress edge router 122, or in one of the other provider routers 124-128.

The PCEs 171-173 and the PCC 174 may communicate with one another using PCEP as described in IETF publications RFC 5440 and 6006, which are incorporated herein by reference as if reproduced in their entireties. Additionally, the PCE 172 and the PCC 174 may communicate using Interior Gateway Protocol (IGP) messages comprising PCED extensions as described in IETF publication RFC 5088, which is incorporated herein by reference as if reproduced in its entirety. Specifically, the PCC 174 may send a PCReq message to the PCE 172 to request computation of a P2MP LSP, a P2P LSP, or a portion thereof (e.g., a path or sub-LSP in a P2MP or P2P LSP). Subsequently (e.g., after appropriate cooperation), the P2MP LSP may be established in the network 100. For instance, the P2MP LSP may be set up in the provider domain 120 by establishing Source-to-Leaf (S2L) sub-LSPs between the ingress edge router 122 and the egress edge routers 126-128 along the path for the P2MP LSP using Resource Reservation Protocol (RSVP) as described in RFC 4875.

The P2MP LSP in the network 100 may be susceptible to faults in the provider domain 120. For instance, a fault in one of the provider routers 122-128 may disable the P2MP LSP, thereby necessitating the computation and establishment of a new P2MP LSP (or portion thereof) through the provider domain 120 before multicast service may be fully resumed to all of the destinations. Computing and establishing a new P2MP LSP (or portion thereof) through the provider domain 120 may cause a delay or interruption in the multicast service. As such, some networks may establish backup P2MP LSPs that protect against a fault in the primary P2MP LSP for the purposes of reducing latency, supporting higher Quality of Service (QoS) traffic, and improving system resiliency.

Figure 2:
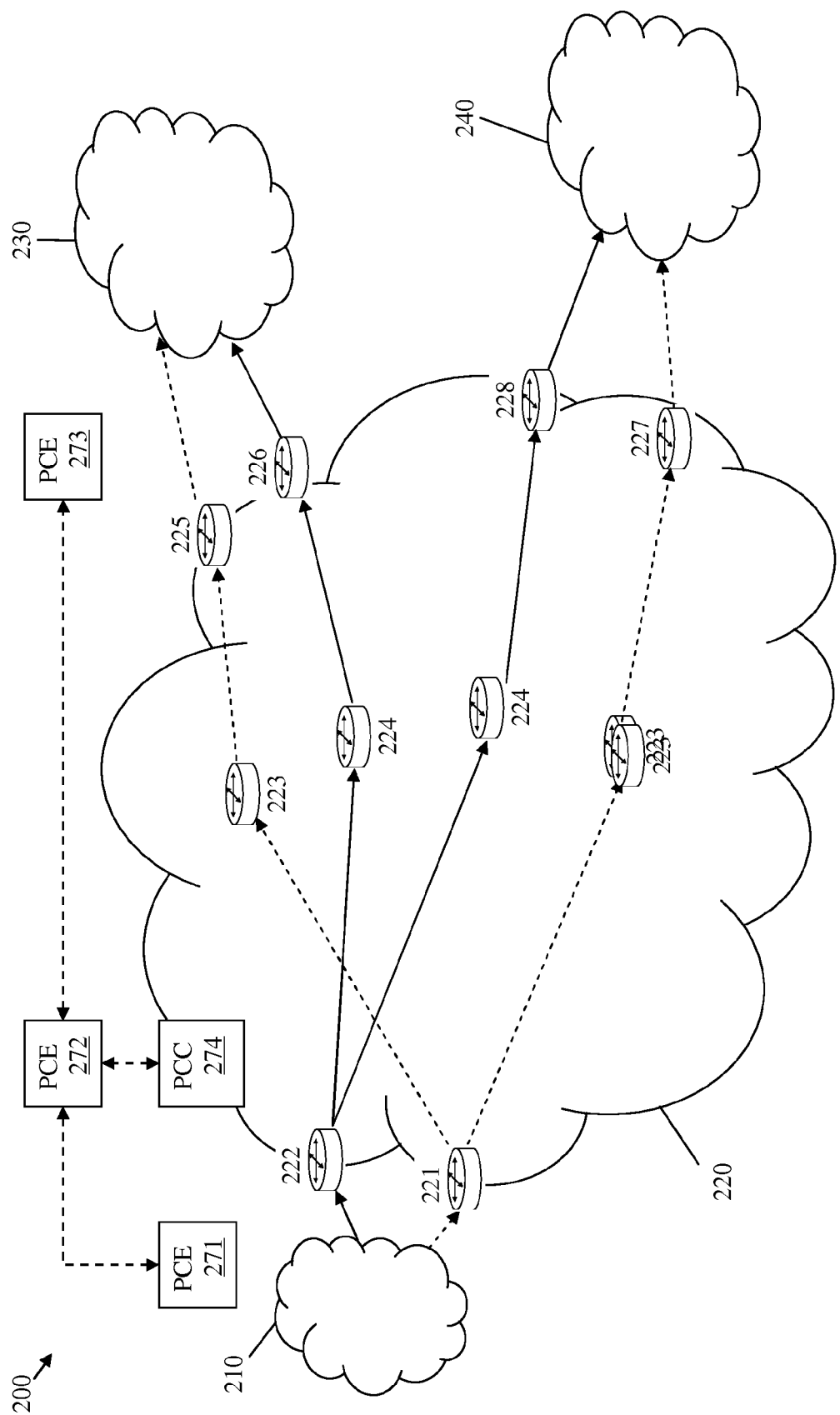
FIG. 2 illustrates an embodiment of a network comprising a primary P2MP LSP and a backup P2MP LSP.

FIG. 2 illustrates an embodiment of a network 200 through which a backup P2MP LSP (illustrated by the dotted arrows) is established to protect against failures in a primary P2MP LSP (illustrated by the solid arrows). The network 200 may comprise a source domain 210, a provider domain 220, a first destination domain 230, a second destination domain 240, a plurality of PCEs 271-273, and a PCC 274, which may be similar to corresponding domains/elements in the network 100. For purposes of clarity and brevity, network components in the source domain 210 and the destination domains 230, 240, as well as AP modems and CPEs are not depicted in FIG. 2, but are inherently present as recognized by those of ordinary skill in the art.

The provider domain 220 comprises ingress edge routers 221-222, a plurality of internal routers 223-224, and a plurality of egress edge routers 225-228, which may be substantially similar to corresponding elements in the provider domain 120. The primary P2MP LSP and the backup P2MP LSP may extend from the source domain 210 through the provider domain 220 to the destination domains 230, 240, as shown in FIG. 2. In the provider domain, the P2MP LSP may branch from the primary ingress edge router 222 through the primary internal routers 224 to the primary egress edge routers 226 and 228, while the backup P2MP LSP may extend from the secondary ingress edge router 221 through the secondary internal routers 223 to the secondary egress edge routers 225 and 227. Multicast traffic may be carried over the primary P2MP LSP so long as the P2MP LSP is operable and provides sufficient throughput capacity to satisfy existing service requirements. However, if a fault occurs on the primary P2MP LSP, then some or all of the traffic may be transferred to the backup P2MP LSP. Specifically, a fault in the primary P2MP LSP may be detected by one or more network elements in the provider domain 220 (or the source domain 210/destination domains 230, 240), which may subsequently propagate a fault indication (e.g., using control messages) to the ingress router 222, the source domain 210, the destination domains 230, 240, or combinations thereof. Upon receiving the fault indication, the primary ingress edge router 222 or the source domain 210 may transfer the traffic to the backup P2MP LSP. In some embodiments, the backup P2MP LSP may optionally branch from the ingress edge router 221 (rather than the primary ingress edge router 222) when the fault is not attributable to the ingress edge router 221. In such embodiments, the ingress edge router 221 (rather than the source domain 210) may transfer the traffic to the backup P2MP LSP, thereby allowing the provider domain 220 to provide transparent fault recovery (e.g., diverting the traffic to the backup P2MP LSP without notifying the source domain 210 of the failure in the primary P2MP LSP).

By taking precautionary (rather than reactionary) measures, the backup/primary P2MP LSP configuration in the network 200 may be more robust than the unprotected P2MP LSP configuration in the network 100. On the other hand, the backup/primary P2MP LSP configuration in the network 200 may consume more network resources (e.g., about twice the reserved bandwidth) than the unprotected P2MP LSP configuration in the network 100, even though the networks 100 and 200 may support about the same throughput of connection-oriented traffic. Additionally, it may take some time to communicate a failure indication all the way back to the source domain 210 (or the primary ingress edge router 222), which may cause a service delay when switching from the primary P2MP LSP to the backup P2MP LSP. Hence, the network 200 may be unable to support some high QoS traffic types, e.g., real time services such as internet protocol (IP) television (IPTV), voice-over-IP, etc. As such, a method and architecture for providing faster failure recovery while consuming fewer network resources (e.g., reserved bandwidth) is desired.

Figure 3:
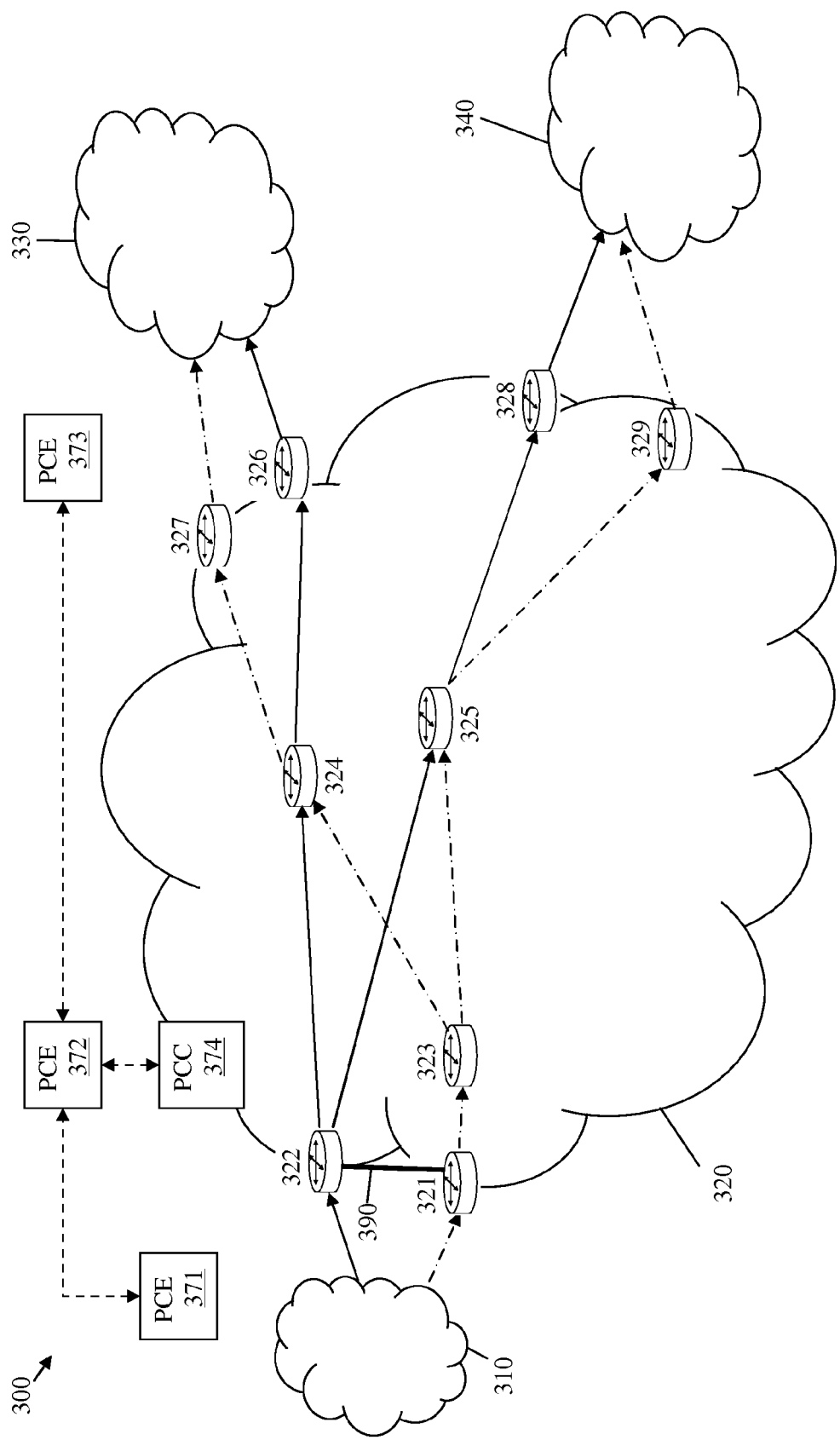
FIG. 3 illustrates an embodiment of a network comprising a primary P2MP LSP with localized backup protection.

FIG. 3 illustrates a network 300 through which a P2MP LSP (illustrated by the solid arrows) with localized backup protection (illustrated by the dashed-dotted arrows) is established. The network 300 may comprise a source domain 310, a provider domain 320, a first destination domain 330, a second destination domain 340, a plurality of PCEs 371-373, and a PCC 374, which may be arranged as shown in FIG. 3 and may be similar to the corresponding domains/elements in the network 200. The provider domain 320 may comprise a plurality of ingress edge routers 321-322, a plurality of internal routers 323-325, and a plurality of egress routers 327-329, which may be arranged as shown in FIG. 3 and configured similarly to the corresponding routers of the provider domain 220. However, the provider domain 320 may employ a P2MP LSP with localized backup protection, instead of separate primary and backup P2MP LSPs. Specifically, the P2MP LSP with localized backup protection may comprise a backup ingress LSP to protect the primary ingress LSP of the P2MP LSP. Additionally, the P2MP LSP with localized backup protection may comprise a backup egress LSP for each primary egress LSP (e.g., for each of the edge routers 326, 328 (and links attached thereto) of the P2MP LSP).

In the event of a fault in a primary ingress or primary egress, multicast traffic may be quickly re-routed to the appropriate backup ingress LSP or backup egress LSP such that the multicast traffic is diverted around the faulty node/link. For instance, the previous-hop internal router 324 may detect a fault in the primary egress router 326 (or link attached thereto), and immediately re-route the traffic to the backup egress router 327. Local re-routing of the traffic at the previous-hop internal router 324 may take less time than communicating a fault indication back to the primary ingress edge router 322 (or the source domain 310/destination domains 330, 340), thereby allowing swifter fault recovery.

The backup ingress LSP may be established prior to (e.g. an existing LSP may be used), subsequent to, or concurrently with the primary P2MP LSP. Specifically, the PCC 374 may send a PCReq message to the PCE 372 requesting computation of a backup ingress path. Upon receiving the PCReq message, the PCE 372 may select the backup ingress edge router 321 based on network topology information and/or computational constraints. For instance, a computational constraint may require that the backup ingress edge router 321 directly connect with an appropriate external node in the source domain 310 (e.g., the same CE router that forwards the traffic to the primary ingress edge router 322). Other common computational constraints may include a maximum number of hops (Max-Hops), available bandwidth capacity, and other TE constraints communicated in the PCReq message. The PCE 372 may then send a PCEP reply (PCRep) message that specifies information regarding the backup ingress path to the PCC 374. For instance, the PCRep message may identify the backup ingress edge router 321 and/or specify information relating to the backup ingress path extending from the backup ingress edge router 321 to the next-hop nodes of the primary ingress edge router 322.

The PCC 374 may thereafter communicate the backup ingress path information to the primary ingress edge router 322. As used herein, backup ingress information may identify the backup ingress edge router 321 and/or specify the backup ingress path. In some embodiments, the PCC 374 may be located at the primary ingress edge router 322, and hence the PCE 372 may communicate the backup ingress path information directly to the primary edge router 322, e.g., by virtue of sending the backup ingress path information to the PCC 374. Alternatively, the PCC 374 may be separate from the primary ingress edge router 322, in which case the PCC 374 may send a message comprising the backup ingress path information to the primary ingress edge router 322. Upon receiving the backup ingress path information, the primary ingress edge router 322 may establish a communication channel 390 with the backup ingress edge router 321, which may be used to communicate the backup ingress path information (and/or other information) to the backup ingress edge router 321. Such information may be communicated to the backup ingress edge router 321 via an Open Shortest Path First (OSPF) type 9 Link State Advertisement (LSA) message comprising a new type-length-value (TLV) that contains some or all of the backup ingress path information. Alternatively, the information may be communicated to the backup ingress edge router 321 via an RSVP-TE PATH message comprising a flag indicating that the message relates to establishing a backup ingress sub-tree/LSP for the primary ingress edge router 322.

Thereafter, the backup ingress edge router 321 may establish a backup ingress P2MP sub-tree that branches to the next-hop internal routers 324, 325 of the primary ingress edge router 322 in the primary P2MP LSP. Alternatively, the backup ingress P2MP sub-tree may branch to nodes that are located several hops down from the primary ingress edge router 322 in the primary P2MP LSP (e.g., subsequent-hop nodes). In some embodiments, the backup ingress P2MP sub-tree may extend through an intermediate internal router 323 before branching back to the primary P2MP LSP at the next-hop internal routers 324, 325. In the same or other embodiments, the ingress sub-tree may be established directly between the backup ingress edge router 321 and one or more of the next-hop internal routers 324, 325 (e.g., without extending through the intermediate internal router 323). In still other embodiments, a backup ingress LSP (e.g., rather than a backup ingress P2MP sub-tree) may be established between the backup ingress edge router 321 and a single next-hop internal router, as may be the case when the primary P2MP LSP branches to a single next-hop router (e.g., rather than a plurality of next-hop routers) following the primary ingress edge router 321. For instance, a backup ingress LSP may be established for network topologies resembling that of the network 100, where the primary ingress edge router 122 branches to a single next-hop internal router 124. As used herein, the term 'backup ingress LSP' may be used interchangeably with the term 'backup ingress P2MP sub-tree' when doing so is appropriate based on the configuration of the primary P2MP LSP. The backup ingress edge router 321 may identify the next-hop internal routers 324, 325, or nodes located several hops down, as being included in the primary P2MP LSP based on the RRO and/or the S2L sub-LSP flow descriptor list received from the primary ingress edge router 322.

The backup ingress edge router 321 may create the backup ingress P2MP sub-tree by sending a PATH message along the computed path to the next-hop internal routers 323-325, which may make the appropriate forwarding entries pursuant to receiving the PATH message and sending a reservation (RESV) message for the PATH message. Specifically, the internal router 323 may receive the PATH message from the ingress edge router 321, and subsequently forward the PATH message to each of the next-hop internal routers 324, 325. Upon reception, the next-hop internal router 324, 325 may make the appropriate forwarding entries and return a RESV message to the internal router 323. Thereafter, the internal router 323 may create an appropriate forwarding table entry (e.g., forwarding state) for the backup ingress P2MP sub-tree pursuant to receiving the RESV message from the next-hop internal router 324, 325, and then return a RESV message to the backup ingress edge router 321. Subsequently, the backup ingress edge router 321 may create an appropriate forwarding table entry (e.g., forwarding state) for the backup ingress P2MP sub-tree pursuant to receiving the RESV message from the internal router 323. The PATH and RESV messages discussed herein may be similar to the PATH and RESV messages defined by the IETF in RFC 4875, which is incorporated herein by reference as if reproduced in its entirety.

After establishing the backup ingress sub-tree, the backup ingress edge router 321 may detect a failure in the primary ingress edge router 322 using common failure detection mechanisms, such as Bi-directional Forwarding Detection (BFD) over the communication channel 390 or any other interface or P2P LSP between the primary ingress edge router 322 and the backup ingress edge router 321. Upon detecting a failure in the primary ingress edge router 322, the backup ingress edge router 321 may notify the source domain 310 of the fault, which may divert the traffic to the backup ingress edge router 321. The backup ingress edge router 321 may then forward the diverted traffic over the backup P2MP sub-tree, where it may merge back to the primary P2MP LSP at the next-hop internal routers 324, 325. In some embodiments, the source domain 310 may normally transmit the traffic to both the primary ingress edge router 322 and the backup ingress edge router 321. In such embodiments, the preliminary step of signaling the source domain 310 may be unnecessary, and the backup ingress edge router 321 may simply forward the traffic via the backup P2MP sub-tree immediately upon detecting a failure in the primary ingress edge router 322. This may allow for faster and transparent fault recovery such that the source domain is not notified of the fault in the primary ingress edge router 322.

The backup egress LSPs may be P2MP sub-LSPs, a P2P bypass tunnels, or a P2P detour tunnels, and may be established prior to (e.g., an existing LSP may be used), subsequent to, or in conjunction with the primary P2MP LSP using protocols discussed herein. A backup egress LSP for protecting a primary egress router of a P2MP LSP extends from a previous-hop internal router of the primary egress router to a backup egress router. Once established, the backup egress LSP may protect against faults in the primary egress and/or the link(s) attached thereto. Specifically, the previous-hop internal router 324 may detect a fault in the primary egress edge router 326 (or link attached thereto) using conventional detection means (e.g., BFD), and subsequently divert the traffic to the backup egress LSP. Upon reception, the backup egress edge router 327 may forward the diverted traffic to an appropriate external destination node according to a forwarding database. In an embodiment, the appropriate external destination node may be the same ingress CE router (in the destination domain 330) to which the traffic was previously forwarded by the primary egress edge router 326. Alternatively, the appropriate external destination node may be a different CE router, in which case the traffic may be subsequently delivered to the same internal node or egress edge routers in the destination domain 330 (e.g., router 137 in the destination domain 130).

Figure 4:
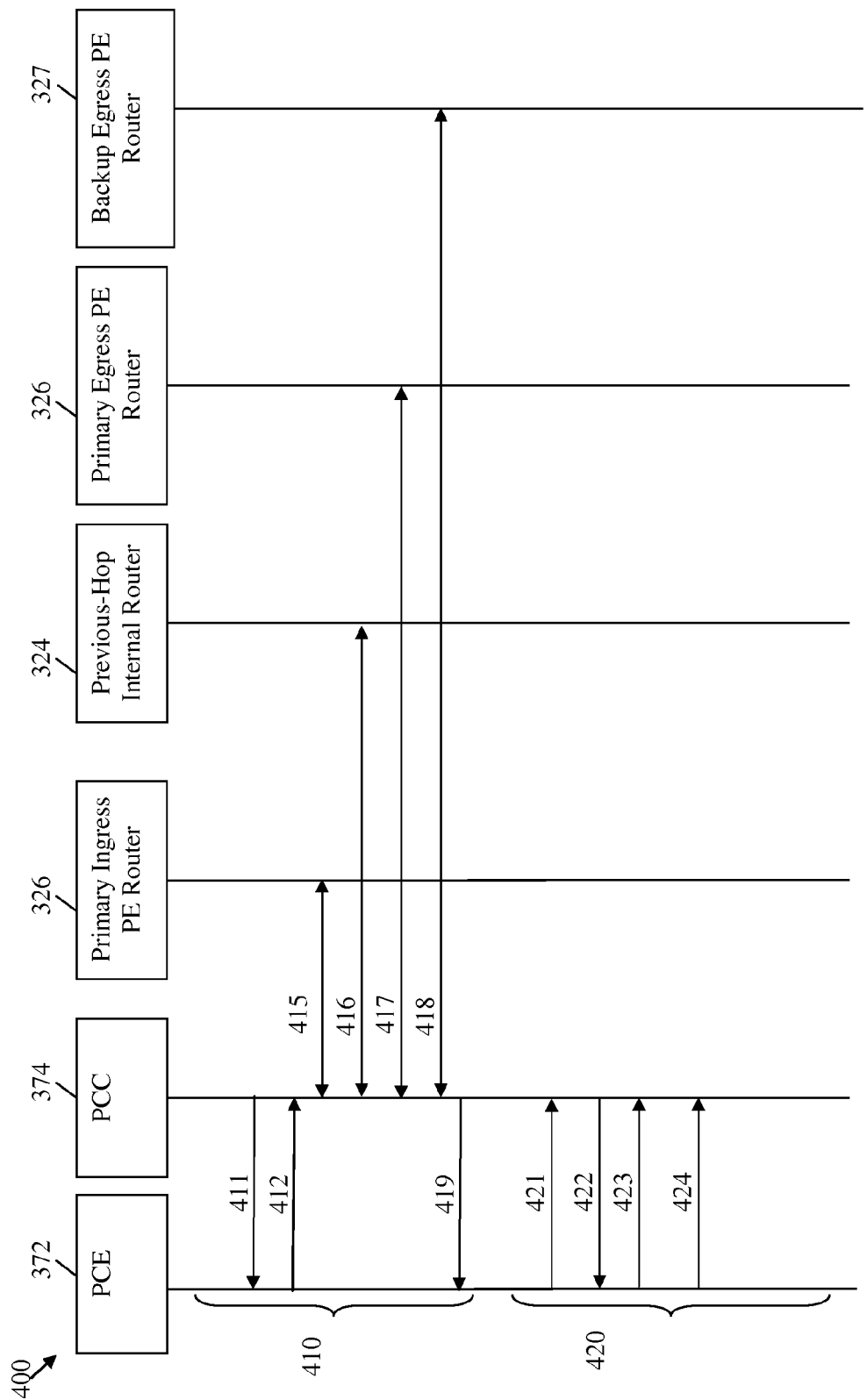
FIG. 4 illustrates an embodiment of a protocol for advertising a backup egress path computation capability and computing a backup egress.

FIG. 4 illustrates an embodiment of a protocol 400 for advertising a backup egress path computation capability and computing a backup egress path in the network 300. Advertising a backup egress path computation capability may comprise declaring that a PCE has the capability to select a backup egress node and/or compute a backup egress path. The protocol 400 may allow the PCE 372 to advertise the backup egress path computation capability either during an IGP initialization 410 or during a PCEP session 420. The IGP initialization 410 and the PCEP session 420 may overlap and/or occur in differing orders.

In general, the IGP initialization 410 may allow the PCC 374 to discover the PCE 372, as well as allow the PCE 372 to learn topology information and/or TE information (e.g., build a TED) pertaining to the provider network 320. Specifically, the PCE 372 and the PCC 374 may engage in PCE discovery by exchanging the IGP PCED messages 411-412, which may be IGP messages that include an appropriate PCED extension. For instance, the IGP PCED messages 411-412 may comprise a PCED TLV that includes one or more PCED sub-TLVs specifying various information/capabilities of the PCE 372, e.g., a PCE-ADDRESS sub-TLV, a PATH-SCOPE sub-TLV, etc. In an embodiment, the IGP messages 411-412 may comprise a PCE capability sub-TLV, such as the PCE capability sub-TLV 600 that is depicted in FIG. 6. In addition, the provider domain network entities (e.g., the nodes 321-329 and the PCC 374) may communicate routing and/or topology information with one another by flooding IGP messages 415-418 throughout the provider domain 320, thereby allowing provider domain network entities (e.g., the nodes 321-329 and the PCC 374) to develop a topological understanding of the provider domain 320. In some embodiments, the PCE 372 may be part of a router, e.g., a Label Switched Router (LSR), in the provider domain 320, and hence may develop a topological understanding of the provider domain 320 through receiving the flooded IGP messages 415-418. In other embodiments, the PCE 372 may be part of an external server (e.g., located outside of the provider domain 320), in which case topological information contained in the IGP messages 415-418 may be relayed to the PCE 372 by the PCC 374 or other means via an IGP message 419.

In an embodiment, the IGP messages 411-419 may comprise OSPF LSA messages as described in IETF publications RFC 2370 and RFC 3630 (for Internet Protocol (IP) version 4 (IPv4))as well as in IETF publications RFC 5340 and RFC 5329 (for IP version 6 (IPv6)), all of which are incorporated herein by reference as if reproduced in their entireties. Alternatively, the IGP messages 411-417 may comprise intermediate-system-to-intermediate-system (IS-IS) LSA messages as defined in IETF publication RFC 1142, which is also incorporated herein by reference as if reproduced in its entirety. In an embodiment, the IGP PCED messages 411-412 may comprise IGP protocol extensions for PCED as described in IETF publications RFC 5088 (OSPF Protocol Extensions for PCED) and RFC 5089 (IS-IS Protocol Extensions for PCED), both of which are incorporated by reference herein as if reproduced in their entireties.

The PCEP session 420 may allow for the computation of the backup egress path in the provider domain 320, which may comprise selecting the backup egress edge router 327 and/or computing the backup egress path (e.g., the dash-dotted line extending from the previous-hop internal router 324 of the primary egress edge router 326 to the backup egress router 327). Additionally, the PCEP session 420 may allow the PCE 372 to advertise capability information that was not discovered by the PCC 374 during IGP initialization 410. Specifically, PCEP session 420 may begin when the PCE 372 sends a PCEP OPEN message 421 to the PCC 374. In some embodiments, the PCEP OPEN message 421 may comprise a PCE capability TLV advertising the PCE 372's backup egress path computation capability, such as the PCE capability TLV 700 that is depicted in FIG. 7. Subsequently, the PCC 374 may communicate various information through the exchange of one or more PCEP messages 422-424. For instance, the PCEP messages 422-424 may include a PCReq message 422, a PCRep message 323, and a PCE Error (PCErr) Message 424, as well as other PCEP messages defined in RFC 5440 (e.g., keep-alive, notification, close, etc.). The PCReq message 422 may comprise various objects, e.g., LSPA, BANDWIDTH, metric-list, LOAD balancing, etc., as described in IETF publications RFC 5440 and RFC 6006, which are incorporated herein by reference as if reproduced in their entireties.

The PCEP messages 422-424 may allow the computation of the backup egress path in the network 300. Specifically, the PCReq message 422 may request computation of the backup egress path in the network 300, and may comprise an RP object and/or an EDN object, such as the RP object 800 depicted in FIG. 8 and/or the EDN object 900 or EDN object 1000 depicted in FIGS. 9 and 10 (respectively). Upon reception of the PCReq message 422, the PCE 372 may attempt to compute the backup egress path based on computation constraints that were included in the PCReq message 422 or known to the PCE 372.

In some embodiment, the PCE 372 may send the PCRep message 423 to the PCC 374. If the computation was successful, then the PCE 372 may include the backup egress path information in the PCRep message 423. Alternatively, the PCE 372 may determine that no path satisfies all of the computation constraints, and may include a NO-PATH object in the PCRep message 423, e.g., similar to the NO-PATH object 1200 depicted in FIG. 12, that indicates a reason why the path could not be computed. If the NO-PATH object indicates that the path could not be computed because of a reach-ability issue, the NO-PATH object may comprise an unreachable IP address TLV, e.g., similar to the unreachable IP address TLV 1300 depicted in FIG. 13, that identifies one or more unreachable IP addresses. In either case, the PCRep message 423 may comprise an RP object specifying that the PCRep message 423 relate to the computation of a backup egress path. Subsequently, the backup egress LSP may be established in the network 300.

In other embodiments, the PCE 372 may determine that computation of the backup egress path could not be performed due to a protocol error condition or because the PCReq message 422 was non-compliant (e.g., malformed, missing a mandatory object, etc.). In such embodiments, the PCE 372 may send a PCErr message 424 to the PCC 374 comprising a PCEP error object, such as the PCEP error object 1100 depicted in FIG. 11, that indicates a reason why the backup egress path could not be computed, e.g., no backup egress path computation capability, insufficient memory, etc.

Figure 5:
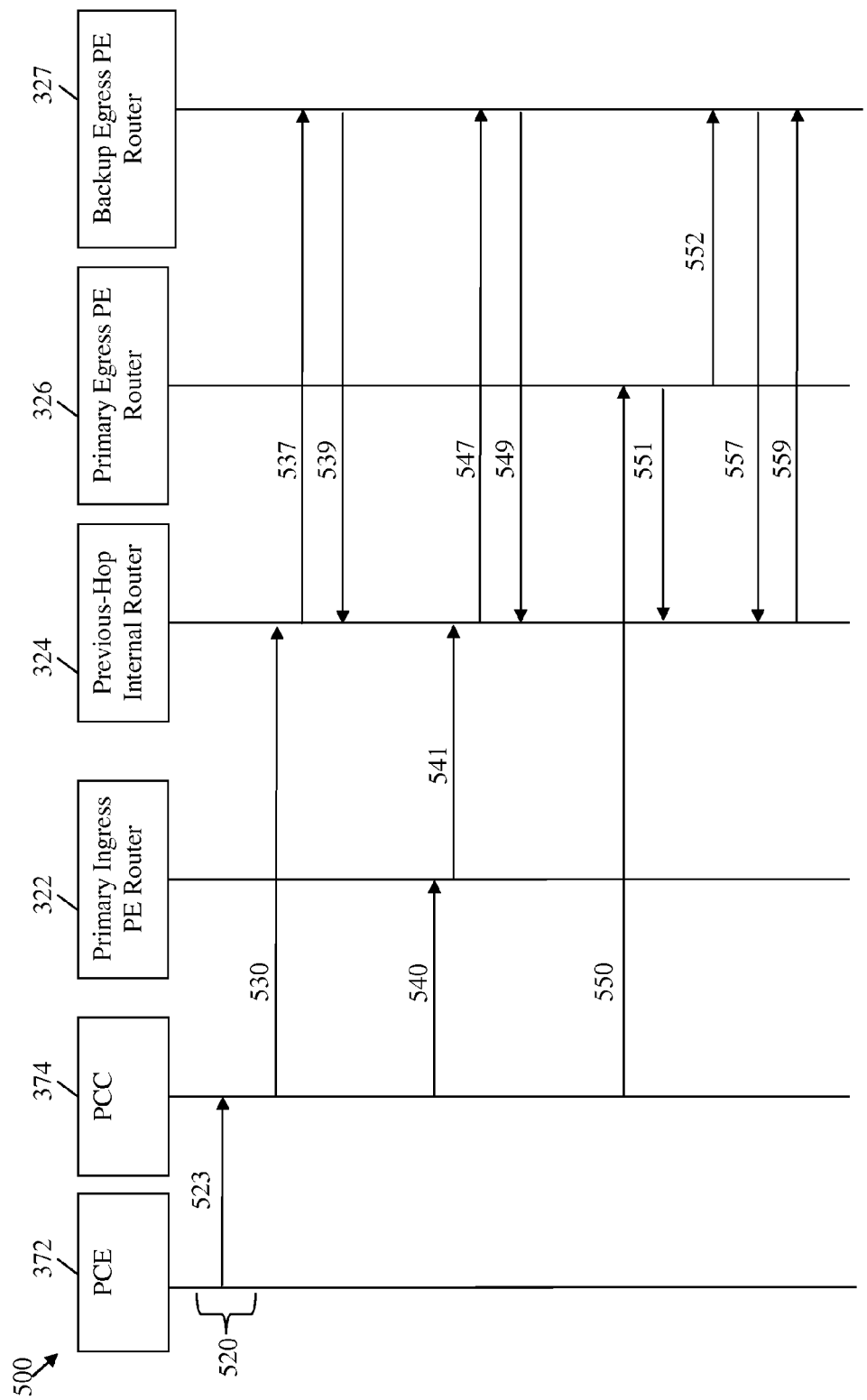
FIG. 5 illustrates an embodiment of a protocol for establishing a backup egress LSP.

FIG. 5 illustrates a protocol 500 for establishing a backup egress LSP in the network 300. The backup egress LSP may be established prior to, subsequent to, or concurrently with the primary P2MP LSP. During the PCEP session 520, the PCC 374 may receive a PCRep message 523 containing backup egress path information, e.g., information relating to the backup egress node or backup egress path. The PCRep message 523 may be somewhat similar to the PCRep message 423, and may comprise an RP object indicating that the PCRep message 523 pertains to computation of the backup egress. Upon reception of the PCRep message 523, the PCC 374 may communicate the backup egress path information and/or other information to the previous-hop internal router 324, the backup egress edge router 327, or both.

In an embodiment, the PCC 374 may communicate the backup egress path information directly to the previous-hop internal router 324 via a message 530. Specifically, the previous-hop internal router 324 may set up the backup egress LSP by sending an RSVP-TE PATH message 537 to the backup egress edge router 327 along the path for the backup egress LSP. Upon reception, the backup egress edge router 327 may make the appropriate forwarding entry (e.g., associating the P2MP LSP with an appropriate CE router in the destination domain 330) based on information contained in the RSVP-TE PATH message 537, and subsequently send an RSVP-TE RESV message 539 to the previous-hop internal router 324. Upon reception, the previous-hop internal router 324 may make a forwarding table entry corresponding to the backup egress edge router 337, which may be used to forward traffic over the backup egress LSP in the event of a fault in the primary egress.

In another embodiment, the PCC 374 may communicate the backup egress path information to the previous-hop internal router 324 indirectly (i.e., via the primary ingress edge router 322) using the messages 540-541. Specifically, the PCC 374 may send a message 540 comprising the backup egress path information to the primary ingress edge router 322, which may subsequently forward the backup egress path information to the previous-hop internal router 324 by sending a PATH message 541 along the P2MP LSP. Thereafter, the previous-hop internal router 324 and the backup egress edge router 327 may set up the backup egress LSP by exchanging an RSVP-TE PATH message 547 and an RSVP-TE RESV message 549 in a fashion similar to described above with regards to the RSVP-TE PATH message 537 and a RSVP-TE RESV message 539.

In yet other embodiments, the PCC 374 may communicate the backup egress path information to the previous-hop internal router 324 and/or the backup egress edge router 327 indirectly (i.e., via the primary egress edge router 326) using the messages 550-552. Specifically, the PCC 374 may send a message 550 comprising the backup egress path information to the primary egress edge router 326. Upon reception, the primary egress edge router 326 may forward the backup egress path information to the previous-hop internal router 324 using an RSVP-TE RESV message 551 and/or to the backup egress edge router 327 using an IGP LSA message 552. The IGP LSA message 552 may be an OSPF type 9 LSA comprising a TLV that specifies the backup egress LSP information. Subsequently, the previous-hop internal router 527 and the backup egress edge router 327 may set up the backup egress LSP by exchanging an RSVP-TE PATH message 557 and an RSVP-TE RESV message 559 in a fashion similar to that described above with regards to the RSVP-TE PATH message 537 and a RSVP-TE RESV message 539.

FIG. 6 illustrates a format for a PCE capability sub-TLV 600, which may be included in an IGP message to advertise a backup egress path computation capability of a PCE. The PCE capability sub-TLV 600 may be about N*4 octets in length, and may comprise a type field 610, a length field 620, and a value field 630 arranged as shown in FIG. 6. In an embodiment, the type field 610 may be about 16 bits long and may comprise an integer (e.g., five) that identifies the PCE capability sub-TLV 600, e.g., as assigned by the Internet Assigned Numbers Authority (IANA). The length field 620 may be about 16 bits long and may comprise an integer that represents the length of the value field 630 in bytes. For instance, the length field 620 may be about 16 bits long and may comprise a value of about four when the value field comprises 32 bits. The value field 630 may be about 32 bits long and may comprise a sequence of capability flags for a PCE, including flags 631-637. The flag 631 may be set (i.e., be a one) to indicate that the PCE is capable of computing a backup ingress path for a P2MP LSP or not set (i.e., be a zero) to indicate that the PCE is not capable of computing a backup ingress path for a P2MP LSP. The flag 633 maybe set (i.e., be a one) to indicate that the PCE is capable of computing a backup ingress path for a P2P LSP or not set (i.e., be a zero) to indicate that the PCE is not capable of computing a backup ingress path for a P2P LSP. The flag 635 may be set (i.e., be a one) to indicate that the PCE is capable of computing a backup egress path for a P2MP LSP or not set (i.e., be a zero) to indicate that the PCE is not capable of computing a backup egress path for a P2MP LSP. The flag 637 may be set (i.e., be a one) to indicate that the PCE is capable of computing a backup egress path for a P2P LSP or not set (i.e., be a zero) to indicate that the PCE is not capable of computing a backup egress path for a P2P LSP. In an embodiment, the flags 631, 633, 635, and 637 may be the eleventh, twelfth, thirteenth, and fourteenth bits, respectively, in the value field 630, or may be assigned by the IANA.

FIG. 7 illustrates a PCE capability TLV 700, which may be included in a PCEP message to advertise a backup egress path computation capability of a PCE. In an embodiment, the PCE capability TLV 700 may be included as an optional TLV in an OPEN Object (e.g., of an OPEN PCEP message) that is sent to initiate the establishment of a PCEP session. The PCE capability TLV 700 may comprise a type field 710, a length field 720, and a value field 730 arranged as shown in FIG. 7. The type field 710 may be about 16 bits long and may comprise an integer (e.g., one) that identifies the PCE capability TLV 700, as assigned by IANA. The length field 720 may be about 16 bits long and may comprise an integer (e.g., four) that represents the length of the value field 730 in bytes. The value field 730 may be about 32 bits in long and may comprise a sequence of capability flags 731-737, which may be similar to the capability flags 631-637 in the PCE capability sub-TLV 600 (as described above).

Figure 8:
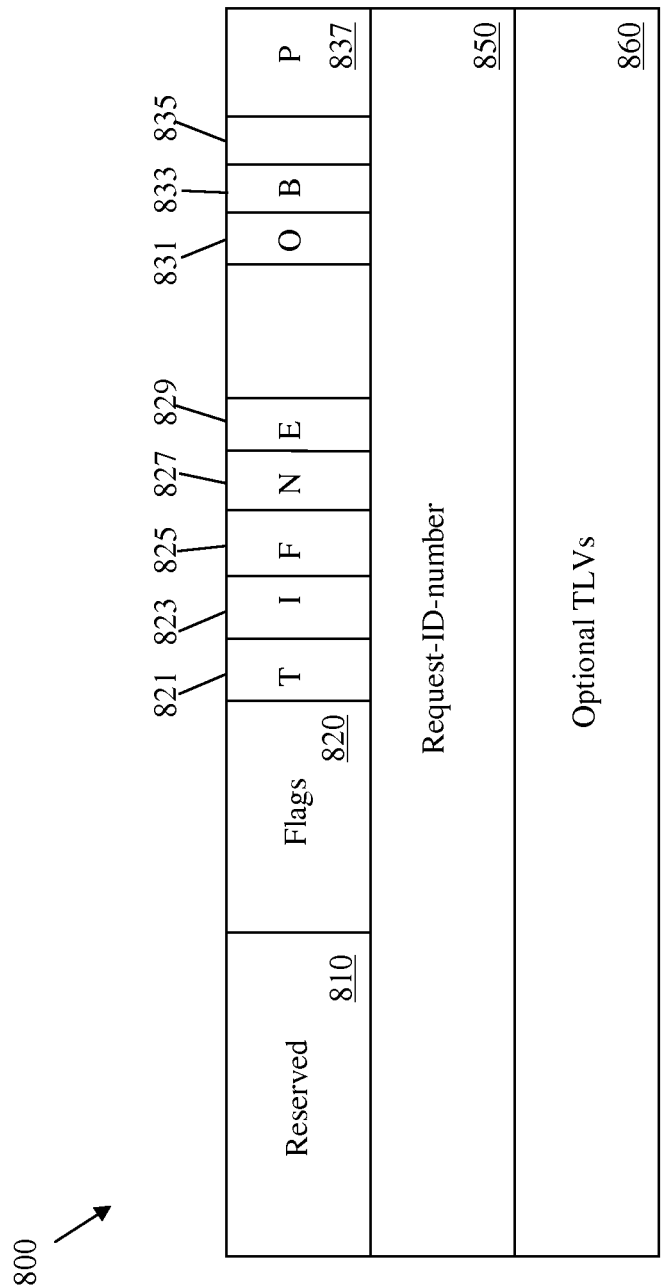
FIG. 8 illustrates an embodiment of an RP object.

FIG. 8 is an illustration of one embodiment of a RP object 800, which may be included in a PCReq or PCRep message to indicate that the message relates to backup egress/ingress computation. The RP object 800 may comprise a reserved field 810, a flags field 820, a request-ID-number field 850, and an optional TLVs field 860 arranged as shown in FIG. 8. The reserved field 810 may comprise about eight bits, may be reserved, or alternatively, may not be used.

The flags field 820 may be about 24 bits long and may comprise a backup egress bit (T) flag 821, a backup ingress bit (I) flag 823, a fragmentation bit (F) flag 825, a P2MP bit (N) flag 827, an ERO-compression bit (E) flag 829, a Strict/Loose bit (O) flag 831, a Bi-directional bit (B) flag 833, a re-optimization (R) flag 835, and a priority field 837. The T flag 821 may be set (i.e., be a one) to indicate that a PCReq message is requesting computation of a backup egress path or that a PCRep message is replying to a request for computation of a backup egress, and may be not set (i.e., be a zero) to indicate that the PCReq or PCRep is not related to computation of a backup egress path (the N flag 827 may indicate whether the LSP is a P2MP or a P2P LSP). The I flag 823 may be set (i.e., be a one) to indicate that a PCReq message is requesting computation of a backup ingress path or that a PCRep message is replying to a request for computation of a backup ingress path, and may be not set (i.e., be a zero) to indicate that the PCReq or PCRep is not related to computation of a backup ingress path. Other flags may be defined in RFC 5440 and RFC 6006. For instance, the O flag 831 may be set in a PCReq message to indicate that a loose path is acceptable, or cleared to indicate that a path comprising exclusively strict hops is required, e.g., where the path is from the previous-hop node (i.e., the node directly preceding a primary egress node of the P2MP LSP) to the backup egress node (i.e., the node that is selected during computation of the backup egress path). The O flag 831 may be set in a reply message to indicate that the computed path is loose, or cleared to indicate that the computed path comprises strict hops. The priority field 837 may be used to specify a recommended request priority that is set locally at the PCC. For instance, the priority field 837 may comprise a value from between about one and seven to indicate some level of priority, or a value of about zero when the request priority is not specified. The flags 820 may also comprise additional bits that are unassigned or reserved, and which may be set to zero and ignored. In an embodiment, each of the flags 821-835 may have a length of about one bit, while the priority field 837 may have a combined length of about three bits.

The request-ID-number 850 may comprise about 32 bits, and may be used included in a PCReq/PCRep message to identify a PCReq message. The request-ID-number 850 may be combined with the source IP address of the PCC or the source IP address of the PCE to identify the PCReq/PCRep messages. The request-ID-number may be changed or incremented each time a new request is sent to the PCE.

Figures 9, 10:
FIG. 9 illustrates an embodiment of an external destination node (EDN) object.
FIG. 10 illustrates another embodiment of an EDN object.

FIG. 9 illustrates an embodiment of an EDN object 900 that may be included in a PCReq message to specify information regarding one or more external destination nodes. Specifically, the EDN object 900 may identify the IP addresses of external destination nodes that connect directly with one or more egress nodes in the P2MP LSP, and may be used by the PCE to select an appropriate backup egress node. The EDN object 900 may comprise an encode field 910 followed by one or more external destination address fields 925-945. The encode field 910 may identify the object 900 as an EDN object type. Additionally, the encode field 910 may be used to distinguish the EDN object 900 from the EDN object 1000 as depicted in FIG. 10 (discussed below). The external destination address fields 925-935 may comprise the IPv4 or IPv6 addresses of external nodes to which multicast traffic is forward by the egress nodes of the primary P2MP LSP. The order of external destination address field(s) 925-935 may correspond with (or be the same as) the order of the egress node(s) of the primary P2MP LSP (or P2P LSP) contained elsewhere in the PCReq message.

FIG. 10 illustrates another embodiment of an EDN object 1000. The EDN object 1000 may differ from the EDN object 900 in that the EDN object 1000 may expressly list the egress-node/external-destination pairs, rather than listing only the external destination nodes. Specifically, the EDN object 1000 may not rely on the existence of a corresponding list of egress nodes elsewhere in the PCReq message, and hence may be more appropriate than EDN object 900 when such a list of egress nodes is not included in the PCReq message. On the other hand, the EDN object 900 may require less bandwidth (e.g., fewer bytes) than the EDN object 1000, and hence may be preferable when the egress nodes are otherwise listed and space in the PCReq message is at a premium. The EDN object 1000 may comprise an encode field 1010, a plurality of egress address field 1020, 1030, and plurality of external node address fields 1025, 1035. The encode field 1010 may be similar to the encode field 910 in that the encode field 1010 may be used to identify object type of the encode object 1000. Accordingly, the encode field 1010 may be used to distinguish the EDN object 1000 from the EDN object 900. The egress address fields 1020, 1030 may list the IP address of the egress node in the P2MP LSP (or the network domain), while the external node address fields 1025, 1035 may be similar to the external node address fields 925, 935. Each of the egress address fields 1020, 1030 may be associated with (e.g., paired with) one or more external node address fields 1025, 1035, thereby indicating that the egress node associated with the egress address field 1020, 1030 forwards multicast traffic communicated over the P2MP LSP to the external destination node associated with the external node address fields 1025, 1035, e.g., the egress node specified in field 1020 forwards data to the external destination node specified in field 1025.

FIG. 11 is an illustration of an embodiment of a PCEP error object 1100, which may be included in a PCEP-ERROR object of a PCErr message to indicate errors associated with a backup egress path computation. The PCEP error object 1100 may comprise a reserved field 1110, a flags field 1120, an error-type field 1130, an error-value field 1140, and an optional TLVs field 1160 arranged as shown in FIG. 11. The error-type field 1130 and error-value field 1140 may comprise values (e.g., to be later assigned by the IANA) that identify a reason why a backup egress path computation could not be performed. In an embodiment, the error-type field 1130 may comprise a new value (e.g., about 18, or some other value not currently assigned by the IANA) to specify that the PCErr message relates to errors associated with a backup egress path computation. In such embodiments, the error-value field 1140 may comprise a first value (e.g., about one) to indicate that the computation could not be performed due to insufficient memory, or a second value (e.g., about two) to indicate that the PCE does not comprise the requisite backup egress path computation capability. In some embodiments, the PCEP error object 1100 may also indicate that a prior received backup egress path computation request is canceled.

Additionally or alternatively, new error-values for existing error-types (i.e., error-type values already assigned by the IANA) may be defined to indicate errors associated with a backup egress path computation. For instance, a new error-value (e.g., error-value field 1140 equal to four) for the PCE capability not supported error-type (e.g., error-type field 1130 equal to two) may be assigned to indicate that the PCE lacks backup egress path computation capability. Likewise, a new error-value (e.g., error-value field 1140 equal to five) for the PCE capability not supported error-type (e.g., error-type field 1130 equal to two) may be assigned to indicate that the PCE has insufficient memory to perform the requested backup egress path computation. Additionally, a new error-value (e.g., error-value field 1140 equal to seven) for the policy violation error-type (e.g., error-type field 1130 equal to equal to five) may be assigned to indicate that the backup egress path computation request does not comply with administrative privileges (e.g., the PCE policy does not support backup egress path computation).

FIG. 12 illustrates an embodiment of a NO-PATH object 1200, which may be included in a PCRep message to indicate a reason why the requested backup egress path computation was unsuccessful. The NO-PATH object 1200 may comprise a nature of issue field 1210, a flags field 1220, a reserved field 1230, and an Optional TLVs field 1260, arranged as shown in FIG. 12 and perhaps similar to those defined in RFC 5440. The nature of issue field 1210 may be about 8 bits long and may comprise an integer that specifies the error category, e.g., no path obeying the constraints is found. The first flags field 1220 may be about 16 bits long and may comprise a plurality of flags, including a C flag 1221 that is set or cleared to indicate the presence or absence of unsatisfied constraints, and the reserved field 1230 may be set to zeros on transmission (e.g., ignored on receipt). The optional TLVs field 1260 may comprise an optional TLV 1240 (e.g., a NO-BACKUP-EGRESS-PATH TLV), which may indicate that no backup egress path existed. The optional TLV 1240 may comprise a type field 1241, a length field 1243, and a value field 1244 arranged as shown in FIG. 12. The type field 1241 may be about 16 bits long and may comprise an integer (e.g., one) that identifies the optional TLV 1240 (e.g., as a NO-BACKUP-EGRESS-PATH TLV), and may be assigned by IANA. The length field 1243 may be about 16 bits long and may comprise an integer (e.g., four) that indicates the length in bytes of the value field 1244. The value field 1244 may be about 31 bits long and may convey information about the error reason. Specifically, the value field 1244 may comprise a flags field 1245 and a reserved field 1248. The flags field 1245 may comprise a reachability (R) flag 1247, which may be about one bit in length and may be set to indicate that there is a reachability issue with all or a subset of addresses in the candidate backup egress nodes. When the R flag 1247 is set, an unreachable IP address TLV may be included in the optional TLVs field 1260, such as the unreachable IP address TLV 1300 depicted in FIG. 13, to list the IP addresses in the candidate backup egress nodes list that are unreachable from the previous-hop node of any egress node of the P2MP LSP. The reserved field 1248 may be set to zeros and/or ignored upon reception.

Figure 13:
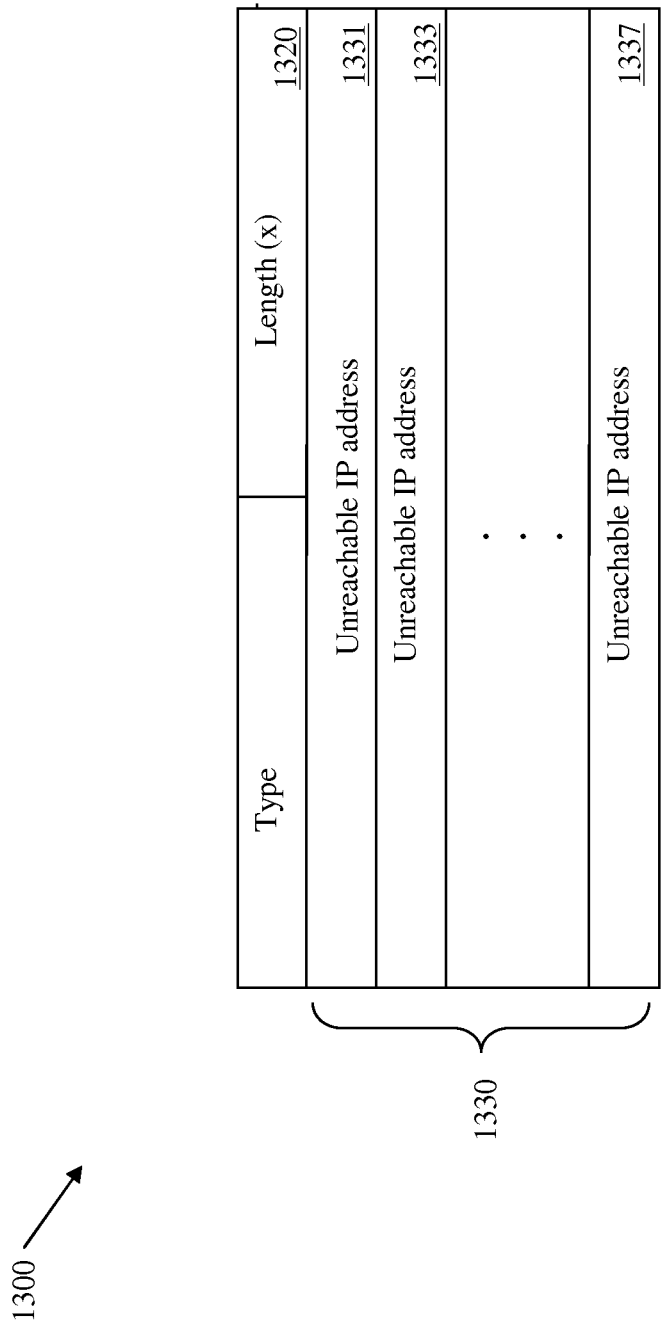
FIG. 13 illustrates an embodiment of an unreachable IP address TLV.

FIG. 13 illustrates an embodiment of an unreachable IP address TLV 1300, which may be included in a NO-PATH object to identify unreachable backup egress nodes. Unreachable backup egress nodes may be those egress edge routers in the provider domain 320 to which no satisfactory path (e.g., a path satisfying all computational constraints) exists from the previous-hop internal router 324. The unreachable IP address TLV 1300 may comprise a type field 1310, a length field 1320, and a value field 1330 as arranged in FIG. 13. The type field 1310 may comprise a value, e.g., as assigned by the IANA, that indicates a characteristic of the value field 1330. For instance, the type field 1310 may comprise a value of about three to indicate that the unreachable IP addresses 1331-1337 are IPv4 addresses or a value of about four to indicate that the unreachable IP addresses 1331-1337 are IPv6 addresses. The length field 1320 may comprise a value that indicates the length of the value field in bytes. The value field 1330 may comprise a plurality of unreachable IP address fields 1331-1337 that comprise the IP addresses of unreachable backup egress nodes.

Figure 14:
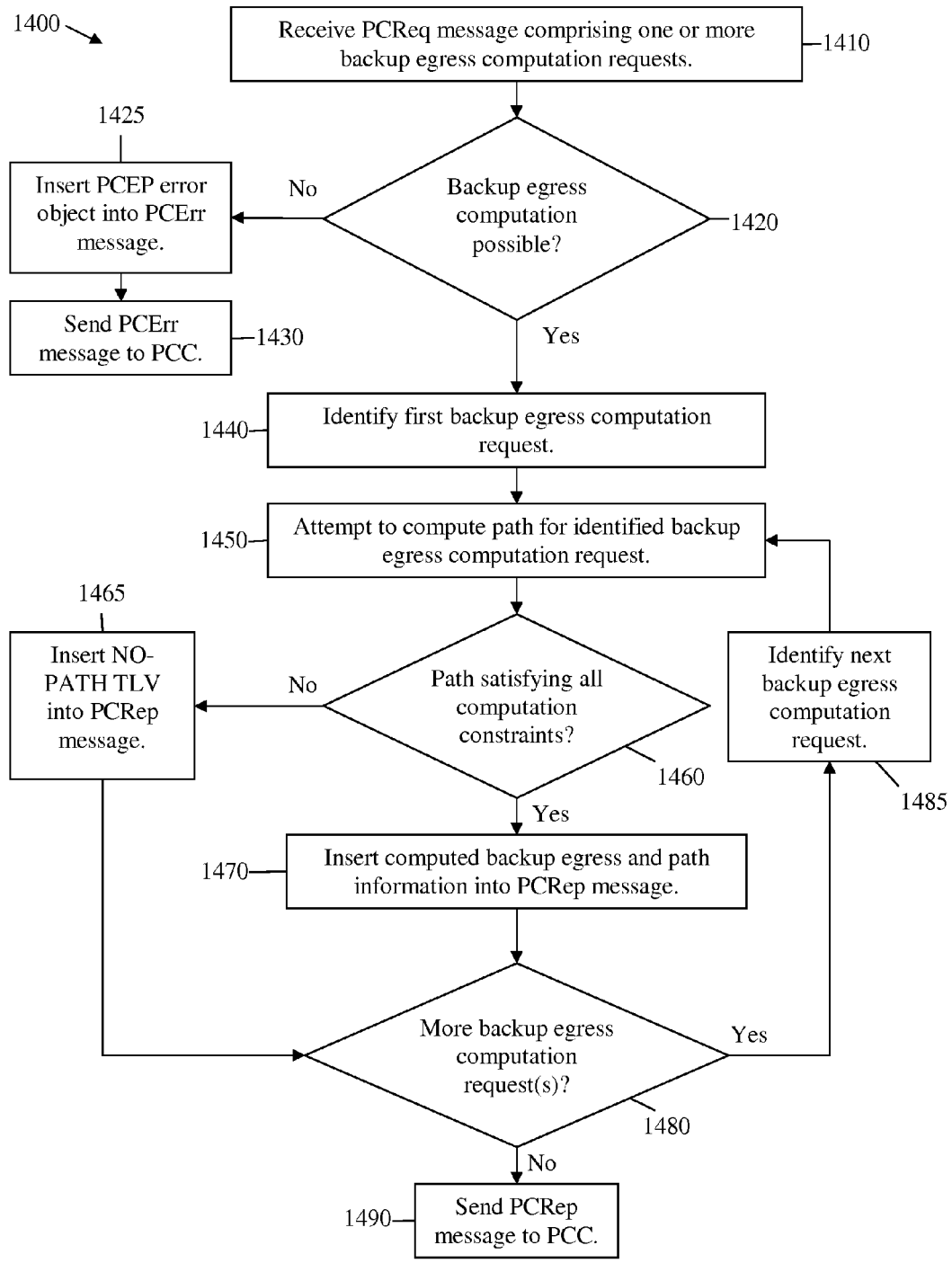
FIG. 14 illustrates an embodiment of a method for computing a backup egress.

FIG. 14 illustrates a method 1400 for computing a backup egress, which may be implemented by a PCE to compute a backup egress path according to a set of constraints. The method 1400 may begin at block 1410, where the PCE may receive a PCReq message comprising one or more backup egress path computation requests. The PCReq message may also comprise an RP object and an EDN object. The method 1400 may proceed to block 1420, where the PCE may determine whether the requested computation(s) are possible, e.g., does the PCE have the requisite capabilities, sufficient processing capacity/memory, etc. If not, the method 1400 may proceed to blocks 1425 and 1430, where the PCE may insert a PCEP error object into a PCErr message and send the PCErr message to the PCC (respectively). If the requested computation is possible, then method 1400 may proceed to block 1440, where the PCE may identify a first backup egress path computation request in the PCReq message. The method 1400 may proceed to block 1450, where the PCE may attempt to compute a path for the backup egress computation request. In some embodiments, computing the path may comprise finding a path that satisfies various computation constraints, which may be either included in the PCReq message or otherwise known to the PCE.

The method 1400 may proceed to block 460, where the PCE may determine whether a path satisfying all the computation requests exists. If not, the PCE may insert a NO-PATH object into the PCRep message at block 1465. In some embodiments, the NO-path object may comprise a NO-BACKUP-EGRESS-PATH TLV (or other optional TLV that specifies a reason why the path could not be found, e.g., reachability, no route, etc.) as well as an unreachable IP address TLV. If, at block 1460, a path satisfying all computation is found (e.g., the attempted computation was a success), then the PCE may insert the backup egress path information into the PCRep message at block 1470. The method may proceed to block 1480 after block 1465 or 1470, where the PCE may determine whether the PCReq message comprises any more backup egress path computation requests. If so, the PCE will identify the next backup egress path computation request at block 1485, and subsequently repeat the steps in blocks 1450-1480. If not, the PCE will send the PCRep message to the PCC at block 1490.

Figure 15:
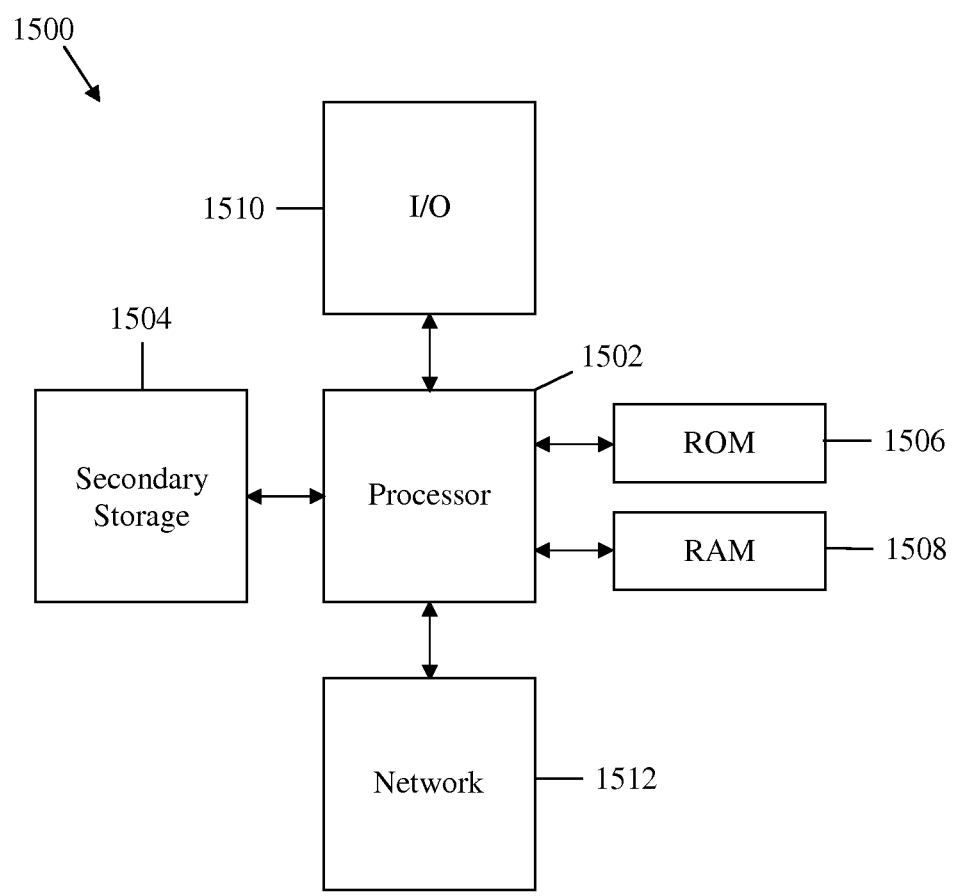
FIG. 15 is an embodiment of a general-purpose computer system.

The network components described above may be implemented on any general-purpose network component, such as a computer or network component with sufficient processing power, memory resources, and network throughput capability to handle the necessary workload placed upon it. FIG. 15 illustrates a typical, general-purpose network component 1500 suitable for implementing one or more embodiments of the components disclosed herein. The network component 1500 includes a processor 1502 (which may be referred to as a central processor unit or CPU) that is in communication with memory devices including secondary storage 1504, read only memory (ROM) 1506, random access memory (RAM) 1508, input/output (I/O) devices 1510, and network connectivity devices 1512. The processor 1502 may be implemented as one or more CPU chips, or may be part of one or more application specific integrated circuits (ASICs) and/or digital signal processors (DSPs).

The secondary storage 1504 is typically comprised of one or more disk drives or erasable programmable ROM (EPROM) and is used for non-volatile storage of data. Secondary storage 1504 may be used to store programs that are loaded into RAM 1508 when such programs are selected for execution. The ROM 1506 is used to store instructions and perhaps data that are read during program execution. ROM 1506 is a non-volatile memory device that typically has a small memory capacity relative to the larger memory capacity of secondary storage 1504. The RAM 1508 is used to store volatile data and perhaps to store instructions. Access to both ROM 1506 and RAM 1508 is typically faster than to secondary storage 1504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus for selecting a backup egress node for a backup egress path, comprising:
   a memory;
   a processor coupled to the memory, wherein the memory includes instructions that when executed by the processor causes the apparatus to perform the following:
   transmit a message that specifies the apparatus is configured to select the backup egress node for the backup egress path;
   receive a path computation element (PCE) protocol (PCEP) request (PCReq) message requesting to select the backup egress node for the backup egress path to protect against a fault in a primary egress node of a Point to Multi-Point (P2MP) or Point-to-Point (P2P) label switched path (LSP); and
   transmit a reply message that comprises a selection result for selecting the backup egress node for the backup egress path,
   wherein the backup egress path extends from a previous-hop internal node of the primary egress node of the P2MP or P2P LSP to a backup egress node, and
   wherein the PCReq message comprises a request parameters (RP) object comprising a backup egress bit (T) flag that is set to a value to specify that the PCReq message is requesting selection of the backup egress node.

2. The apparatus of claim 1, wherein both the previous-hop internal node and the primary egress node are located in a first autonomous system (AS) domain, and wherein the primary egress node is configured to forward traffic associated with the P2MP or P2P LSP to an external node in a second AS domain.

3. The apparatus of claim 1, wherein the PCReq message further comprises an external destination node (EDN) object that specifies the external destination node used to select the backup egress node.

4. The apparatus of claim 1, wherein the message is advertised as an interior gateway protocol (IGP) comprising a PCE discovery (PCED) sub-type length value (sub-TLV), and wherein the PCED sub-TLV comprises a capability flag that is set to specify that the apparatus is configured to select the backup egress node for the backup egress path.

5. The apparatus of claim 1, wherein the message is a PCE protocol (PCEP) message that is transmitted during a PCEP session, and wherein the PCEP message comprises an OPEN object that comprises a capability flag that is set to specify that the apparatus is configured to select the backup egress node for the backup egress path.

6. The apparatus of claim 1, wherein the selection result for selecting the backup egress node for the backup egress path specifies one of the following: at least one selected backup egress node for the backup egress path or unable to select the backup egress node for the backup egress path.

7. A method for computing a backup egress node of a backup egress path at a path computation element (PCE), the method comprising:
   transmitting a message to a path computation client (PCC) that indicates the PCE supports computing the backup egress node;
   receiving a PCE Protocol (PCEP) request (PCReq) message from the PCC requesting computation of the backup egress node to provide fault protection for a primary egress path of a Point to Multi-Point (P2MP) or Point-to-Point (P2P) label switched path (LSP);
   transmitting a reply message that provides a computation result for computing the backup egress node for the backup egress path,
   wherein the primary egress path extends from a previous-hop internal node of the primary egress node of the P2MP or P2P LSP to the primary egress node, and
   wherein the PCReq message comprises a request parameters (RP) object comprising a backup egress bit (T) flag that is set to a value to specify that the PCReq message is requesting selection of the backup egress node.

8. The method of claim 7, wherein both the previous-hop internal node and the primary egress node are located in a first autonomous system (AS) domain.

9. The method of claim 8, wherein the reply message is a PCEP reply (PCRep) message, and wherein the computation result identifies the backup egress node and the backup egress path that extends from the previous-hop node to the backup egress node.

10. The method of claim 8, wherein the PCReq message further comprises an external destination node (EDN) object that comprises an address of an external destination node for the P2MP or P2P LSP, and wherein the external destination node is located in a second AS domain.

11. The method of claim 10, wherein the EDN object further comprises the address of the primary egress node, and wherein the address of the external destination node and the address of the primay egress node are used to compute the backup egress node.

12. The method of claim 11, wherein the computational result is specified in the PCEP error object that indicates the PCE does not have the capability to compute the backup egress node.

13. The method of claim 8, further comprising determining that the computation of the backup egress node requested by the PCReq message cannot be performed, wherein the reply message is a PCEP Error (PCErr) message transmitted to the PCC, and wherein the PCErr message comprises a PCEP error object that indicates a reason why the backup egress node could not be computed.

14. The method of claim 8, wherein the reply message is a PCEP reply (PCRep) message that is transmitted in response to a PCEP request (PCReq) message, and wherein the PCRep message comprises a request parameters (RP) object comprising a backup egress bit flag that specifies the PCRep message is related to the computation of the backup egress node.

15. The method of claim 7, wherein the message is advertised to the PCC during an interior gateway protocol (IGP) initialization, and wherein the message comprises a PCE discovery (PCED) sub-type length value (sub-TLV) with a flag that is configured to indicate the capability of the PCE to compute the backup egress node for the P2MP LSP.

16. The method of claim 15, wherein the PCED sub-TLV comprises a second flag that is configured to indicate the capability of the PCE to compute the backup egress node for the P2P LSP.

17. The method of claim 7, wherein the message is a PCEP message that is not advertised during the interior gateway protocol (IGP) initialization, and wherein the PCEP message comprises an OPEN object that comprises a value field that is set to indicate the capability of the PCE to compute the backup egress node for the backup egress path.

18. A method for computing a backup egress path comprising:
 receiving a Path Computation Element (PCE) Protocol (PCEP) request (PCReq) message from a Path Computation Client (PCC) requesting computation of the backup egress path to provide fault protection for a primary egress path of a Point to Multi-Point (P2MP) or Point-to-Point (P2P) label switched path (LSP);
 attempting to perform the requested computation according to one or more computation constraints, wherein no path is found that satisfies each of the computation constraints; and
 sending a PCEP reply (PCRep) message comprising a NO-PATH-OBJECT to the PCC, wherein the NO-PATH-OBJECT comprises a NO-BACKUP-EGRESS-PATH type length value (TLV) that indicates a reason why the backup egress path could not be computed,
 wherein the primary egress path extends from a previous-hop internal node of the primary egress node of the P2MP or P2P LSP to the primary egress node, and
 wherein the PCReq message comprises an external destination node (EDN) object that specifies that the primary egress node is configured to forward traffic associated with the P2MP or P2P LSP to an external destination node that is located in a second AS (Autonomous System) domain.

19. The method of claim 18, wherein the NO-BACKUP-EGRESS-PATH TLV comprises a reachability (R) flag that indicates that the one or more backup egress nodes could not be reached.

20. The method of claim 19, wherein the NO-PATH-OBJECT further comprises an unreachable Internet Protocol (IP) address TLV that lists the IP addresses of the one or more backup egress nodes that could not be reached.

* * * * *